(12) United States Patent
Hoshuyama et al.

(10) Patent No.: US 9,766,151 B2
(45) Date of Patent: Sep. 19, 2017

(54) LEAKAGE ANALYSIS SYSTEM AND LEAKAGE DETECTION METHOD USING AT LEAST TWO MEASUREMENT TERMINALS

(71) Applicant: NEC Corporation, Minato-ku, Tokyo (JP)

(72) Inventors: Osamu Hoshuyama, Tokyo (JP); Yumi Ono, Tokyo (JP)

(73) Assignee: NEC CORPORATION, Tokyo (JP)

(*) Notice: Subject to any disclaimer, the term of this patent is extended or adjusted under 35 U.S.C. 154(b) by 245 days.

(21) Appl. No.: 14/428,436

(22) PCT Filed: Sep. 18, 2013

(86) PCT No.: PCT/JP2013/075141
§ 371 (c)(1),
(2) Date: Mar. 16, 2015

(87) PCT Pub. No.: WO2014/046122
PCT Pub. Date: Mar. 27, 2014

(65) Prior Publication Data
US 2015/0276539 A1 Oct. 1, 2015

(30) Foreign Application Priority Data
Sep. 18, 2012 (JP) ................................. 2012-204916

(51) Int. Cl.
*G01M 3/00* (2006.01)
*G01B 21/16* (2006.01)
(Continued)

(52) U.S. Cl.
CPC ................. *G01M 3/00* (2013.01); *F17D 5/06* (2013.01); *G01B 21/16* (2013.01); *G01C 21/3407* (2013.01); *G01M 3/243* (2013.01)

(58) Field of Classification Search
CPC .... G01M 3/00; G01M 3/243; G01C 21/3407; G06Q 10/047; G01B 21/16; F17D 5/06
(Continued)

(56) References Cited

U.S. PATENT DOCUMENTS 5,974,862 A * 11/1999 Lander .................. G01M 3/243
702/51
6,567,006 B1 5/2003 Lander et al.
(Continued)

FOREIGN PATENT DOCUMENTS

EP 1371962 A1 12/2003
JP 11-014492 A 1/1999
(Continued)

OTHER PUBLICATIONS

Extended European Search Report for EP Application No. EP13838384.9 dated on Oct. 14, 2016.
(Continued)

*Primary Examiner* — Harshad R Patel
*Assistant Examiner* — Suman K Nath

(57) ABSTRACT

A measurement terminals include: a sensor that measures pipe vibration in a pipe; a measurement information acquisition unit that acquires measurement position information and measurement time information; a transmitter that transmits the pipe vibration, the measurement position information and the measurement time information to an analyzer; a receiver that receives an analysis result from the analyzer; and an output unit that outputs the analysis result from the analyzer. The analyzer includes: a receiver that receives the pipe vibration, the measurement position information, and the measurement time information from the measurement terminals; a storage storing pipe data regarding an installation structure and installation position of the pipe; a leakage position analyzer that analyzes a leakage position in the pipe
(Continued)

on the basis of the pipe vibration, the measurement position information, the measurement time information, and the pipe data; and a transmitter that transmits the analysis result to the measurement terminals.

7 Claims, 11 Drawing Sheets

(51) Int. Cl.
*F17D 5/06* (2006.01)
*G01M 3/24* (2006.01)
*G01C 21/34* (2006.01)

(58) Field of Classification Search
USPC .......................... 73/40.5 A, 40.5 R, 49.1, 40
See application file for complete search history.

(56) References Cited

U.S. PATENT DOCUMENTS

| | | | |
|---|---|---|---|
| 2004/0122602 A1* | 6/2004 | Nagase | G01M 1/225 702/51 |
| 2010/0324839 A1* | 12/2010 | Martin | G01M 3/243 702/56 |
| 2012/0007743 A1* | 1/2012 | Solomon | G01M 3/243 340/605 |
| 2014/0028459 A1* | 1/2014 | Solomon | G01M 3/243 340/605 |
| 2015/0112647 A1* | 4/2015 | Currin | G06Q 50/06 703/1 |

FOREIGN PATENT DOCUMENTS

| | | |
|---|---|---|
| JP | 2002-323400 A | 11/2002 |
| JP | 2005-043321 A | 2/2005 |
| JP | 2008-051776 A | 3/2008 |
| WO | 2012/059108 A1 | 5/2012 |
| WO | 2012/101646 A1 | 8/2012 |

OTHER PUBLICATIONS

International Search Report for PCT Application No. PCT/JP2013/075141, mailed on Oct. 29, 2013.
Japanese Office Action for JP Application No. 2014-536872 dated May 24, 2017 with English Translation.

* cited by examiner

LEAKAGE ANALYSIS SYSTEM AND LEAKAGE DETECTION METHOD USING AT LEAST TWO MEASUREMENT TERMINALS This application is a National Stage Entry of PCT/JP2013/075141 filed on Sep. 18, 2013, which claims priority from Japanese Patent Application 2012-204916 filed on Sep. 18, 2012, the contents of all of which are incorporated herein by reference, in their entirety.

TECHNICAL FIELD

The present invention relates to a leakage analysis system, a measurement terminal, a leakage analysis apparatus, and a leakage detection method.

BACKGROUND ART

Conventionally, there may arise a problem that water or the like leaks in a water pipe, a gas pipe, or the like buried under the ground. To cope with the above problem, a method for detecting a leakage position in a pipe or the like is studied.

As one of the above methods, a method in which an examiner confirms vibrations by his/her ears and detects a water leakage position in a pipe or the like is used. This method is a method in which the examiner listens to a water leakage sound by his/her ears from a land surface, specifies a position to listen to the water leakage sound best, investigates a pipe or the like, and confirms whether a leakage occurs.

However, in the method, since the examiner investigates vibrations in the pipe or the like by his/her ears, an experienced skill is required in order to detect the water leakage position with high accuracy.

Consequently, proposed is a system in which vibration detection devices are arranged in both ends of a measurement section of the pipe, detected pipe vibrations is transmitted to an external water leakage position analysis unit, and it detects the water leakage position in the pipe (Patent Literature 1).

CITATION LIST

Patent Literature

Patent Literature 1: Japanese Laid-open Patent Publication No. 2008-51776

SUMMARY OF INVENTION

Technical Problem

However, there is a problem that in the invention disclosed in Patent Literature 1, a measurement terminal that measures vibrations, etc. in the pipe must be arranged in each predetermined measurement section, and as a result the number of the measurement terminals increases and a cost increases.

Further, there is a problem that even if the measurement terminal is not arranged in each predetermined measurement section but arranged in the pipe every when the examiner performs a measurement, a water leakage position analysis unit is existed separately from the examiner; therefore, the examiner must receive analysis results separately from a site once and go to the site again for the confirmation of leakage, and accordingly work and time are taken.

In view of the foregoing, it is an object of the present invention to provide a leakage analysis system, a measurement terminal, a leakage analysis apparatus, and a leakage detection method that are capable of reducing a cost, work, and time required for the detection of leakage.

Solution to Problem

The present invention is directed to a leakage position analysis system for analyzing a leakage position in a pipe, comprising: at least two or more measurement terminals that are arranged on the pipe; and an analysis means, wherein the measurement terminal includes: a vibration sensor configured to measure pipe vibrations in the pipe; a measurement position information acquisition means configured to acquire measurement position information; a measurement time information acquisition means configured to acquire measurement time information; a wireless transmission means configured to transmit the pipe vibrations, the measurement position information, and the measurement time information to the analysis means by wireless communication; a wireless reception means configured to receive an analysis result of the analysis means by wireless communication; and an output means configured to output the analysis result of the analysis means, the analysis means includes: a wireless reception means configured to receive the pipe vibrations, the measurement position information, and the measurement time information from the measurement terminal by wireless communication; a storage means configured to store pipe data relating to an installation structure and installation position of the pipe; a leakage position analysis means configured to analyze a leakage position in the pipe based on the pipe vibrations, the measurement position information, the measurement time information, and the pipe data; and a wireless transmission means configured to transmit the analysis result to the measurement terminal by wireless communication.

The present invention is directed to a leakage position analysis apparatus for detecting leakage in a pipe, comprising: a storage means configured to store pipe data relating to an installation structure and installation position of the pipe; a leakage position analysis means configured to analyze a leakage position of the pipe based on pipe vibrations, measurement position information, and measurement time information of the pipe measured by at least two or more measurement terminals; and a transmission means configured to transmit the analysis result to the measurement terminals.

The present invention is directed to a measurement terminal arranged in a pipe, comprising: a vibration sensor configured to measure pipe vibrations in the pipe; a measurement position information acquisition means configured to acquire measurement position information; a measurement time information acquisition means configured to acquire measurement time information; a wireless transmission means configured to transmit the pipe vibrations, the measurement position information, and the measurement time information to an analysis means by wireless communication; a wireless reception means configured to receive an analysis result of the analysis means by wireless communication; and an output means configured to output the analysis result of the analysis means.

The present invention is directed to a leakage position analysis method for analyzing a leakage position in a pipe, comprising: causing at least two or more measurement terminals to be arranged in the pipe; causing the measurement terminals to measure pipe vibrations, measurement position information, and measurement time information of the pipe; causing the measurement terminals to transmit the pipe vibrations, the measurement position information, and the measurement time information to an analysis means by wireless communication; causing the analysis means to receive the pipe vibrations, the measurement position information, and the measurement time information from the measurement terminals by wireless communication; causing the analysis means to analyze the leakage position in the pipe based on pipe data relating to an installation structure and installation position of the pipe and the pipe vibrations, the measurement position information, and the measurement time information; causing the analysis means to transmit the analysis result to the measurement terminals by wireless communication; causing the measurement terminals to receive the analysis result by wireless communication; and causing the measurement terminals to output the received analysis result.

Advantageous Effects of Invention

The present invention is capable of reducing a cost, work, and time required for the detection of leakage.

DESCRIPTION OF EMBODIMENTS

First Embodiment

Figure 1:
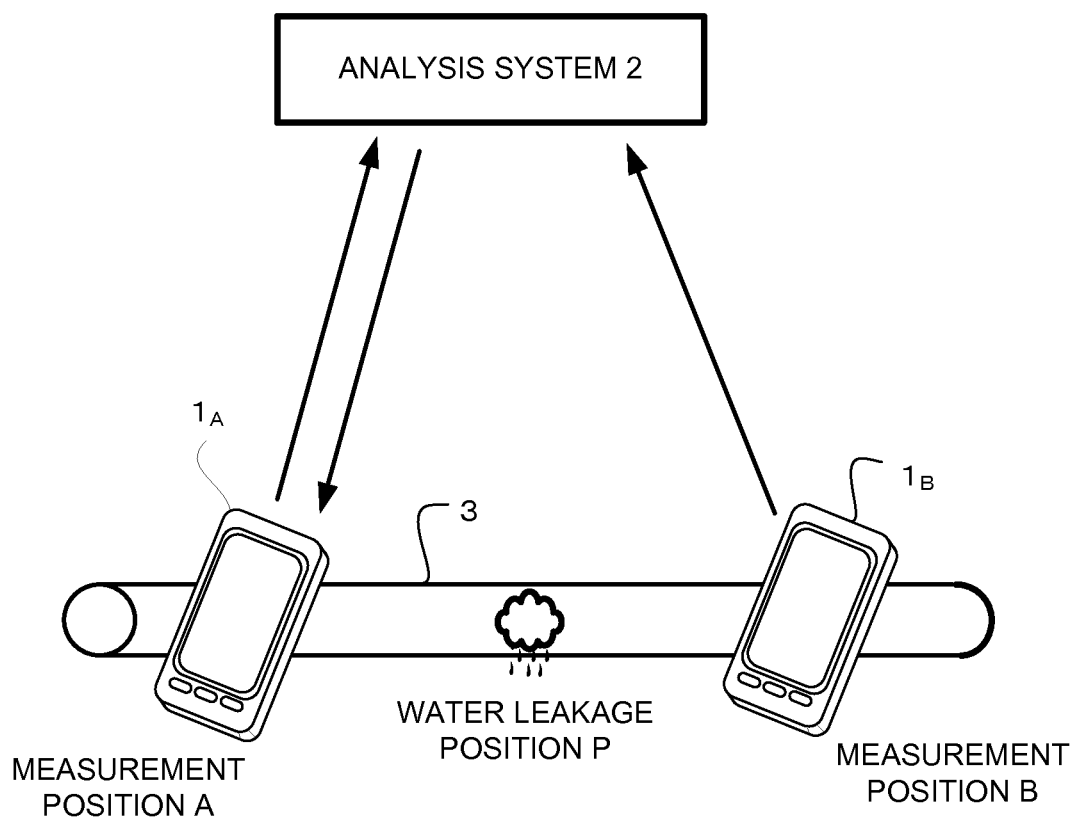
FIG. 1 is a schematic diagram illustrating a configuration of a leakage position analysis system according to a first embodiment of the present invention.

FIG. 1 is a schematic diagram illustrating a configuration of a leakage position analysis system according to a first embodiment of the present invention.

The leakage position analysis system includes at least two or more measurement terminals 1 and an analysis system 2. In the present embodiment, positions to measure leakage detection are set to a position A and a position B, respectively, and devices arranged in respective positions are described with subscripts A and B. For example, the measurement terminal 1 arranged in the position A is described as a measurement terminal $1_A$, and the measurement terminal 1 arranged in the position B is described as a measurement terminal $1_B$. Further, a position in which the leakage occurs in a pipe 3 is described as a position P. In the following description, water leakage of a water pipe will be described as an example; however, the present invention is not limited thereto, and can be also used for leakage detection in fluid tubing of petroleum gases, etc.

Figure 2:
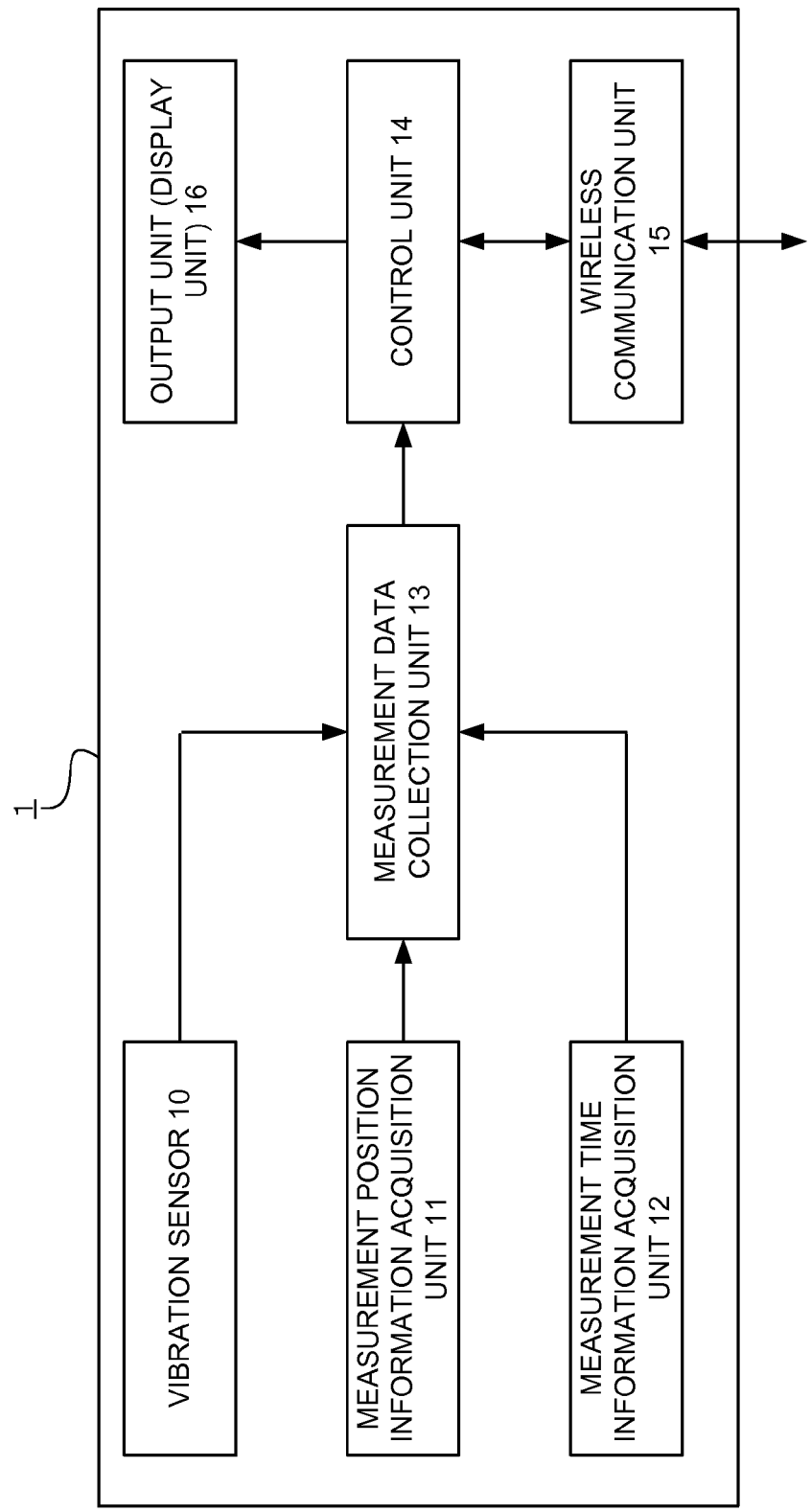
FIG. 2 is a block diagram illustrating a measurement terminal 1.

The measurement terminal 1 will be described. FIG. 2 is a block diagram illustrating the measurement terminal 1.

The measurement terminal 1 includes a vibration sensor 10, a measurement position information acquisition unit 11, a measurement time information acquisition unit 12, a data collection unit 13, a control unit 14, a wireless communication unit 15, and an output (display) unit 16.

The vibration sensor 10 measures pipe vibrations of the pipe 3. Further, the vibration sensor 10 supplies waveform vibration data indicating the measured pipe vibrations to the measurement data collection unit 13.

The measurement position information acquisition unit 11 acquires measurement positions, and is, for example, a GPS (Global Positioning System) or the like. Further, the measurement position information acquisition unit 11 supplies the acquired measurement position information to the measurement data collection unit 13.

The measurement time information acquisition unit 12 acquires a measurement time. The measurement time information acquisition unit 12 is, for example, a GPS or the like. In the measurement time information acquisition unit 12, for improving a leakage analysis accuracy as described later, it is preferable that the time is matched with each other between the measurement terminals 1. To cause the measurement time to coincide with each other, communication may be performed between the measurement terminals 1A and 1B. The measurement time information acquisition unit 12 supplies the acquired measurement time information to the measurement data collection unit 13.

The measurement data collection unit 13 supplies the collected measurement data (waveform vibration data, measurement position information, and measurement time information) to the control unit 14.

The control unit 14 transmits the measurement data from the measurement data collection unit 13 to the analysis system 2 via the wireless communication unit 15. As described later, the control unit 14 further outputs analysis results (leakage position maps) received from the analysis system 2 to the output unit (display unit) 16.

The output unit (display unit) 16 is a display or the like.

A dedicated terminal may be used as the measurement terminal 1; further, for example, by a terminal such as an existing smartphone, application for realizing the above-described function can be introduced into a smartphone to thereby realize the measurement terminal 1.

Figure 3:
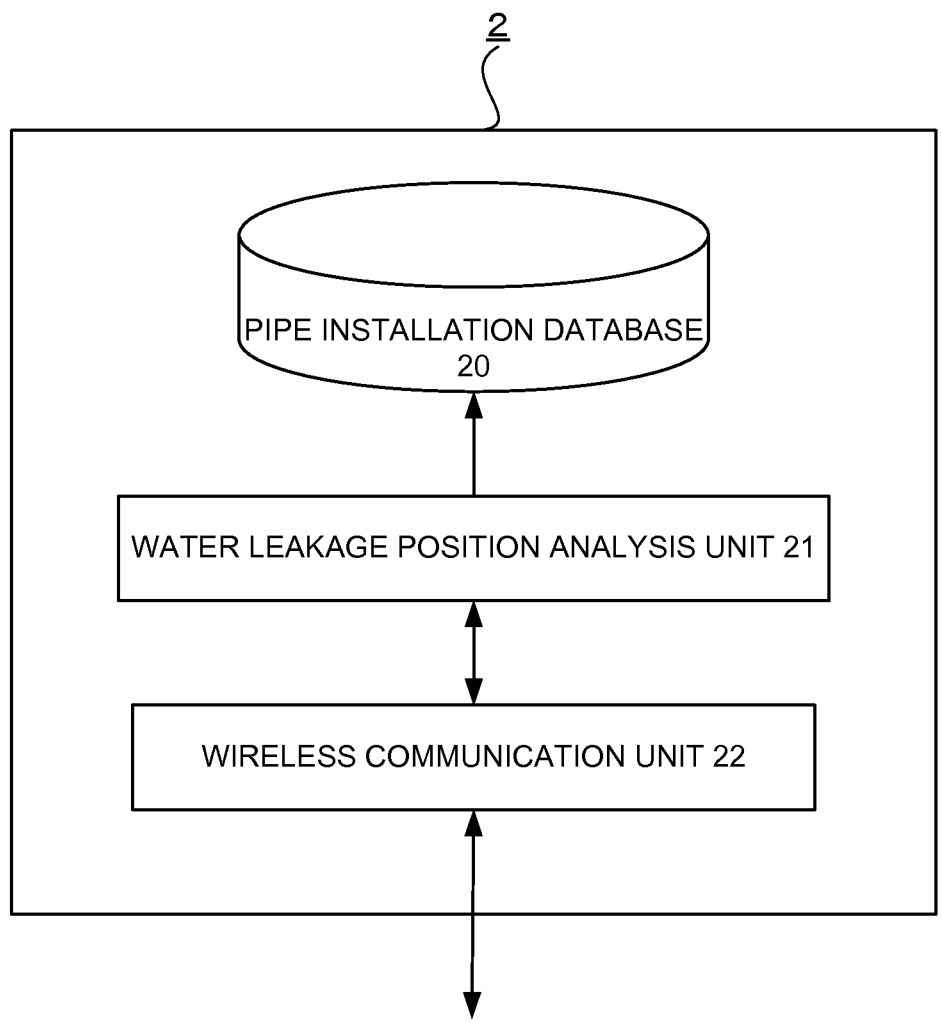
FIG. 3 is a block diagram illustrating an analysis system 2.

Next, the analysis system 2 will be described. FIG. 3 is a block diagram illustrating the analysis system 2.

The analysis system 2 includes a pipe installation database 20, a leakage position analysis unit 21, and a wireless communication unit 22.

In the pipe installation database 20, data such as an installation diagram of pipes (information, etc. about a geographical position in which each pipe is installed) or values of a propagation speed C in the pipe vibrations is stored. Further, a manhole to the pipes, position information about a water meter installed in the pipe, and map information including information about roads, buildings, and the like are also stored in accordance with the installation diagram of the pipes.

The leakage position analysis unit 21 calculates the leakage position P from vibration data $Y_A(t)$ measured by the measurement terminal $1_A$ and vibration data $Y_B(t)$ measured by the measurement terminal $1_B$, and transmits the position to the measurement terminals 1.

Specifically, the leakage position analysis unit 21 calculates a cross-correlation function $\Phi_{AB}(\tau)$ by the following formula (1) from the vibration data $Y_A(t)$ measured by the measurement terminal $1_A$ and the vibration data $Y_B(t)$ measured by the measurement terminal $1_B$.

$$\Phi_{AB} = \int_{-t0}^{t0} Y_A(t) Y_B(t+\tau) dt \qquad (1)$$

Next, in the case in which the cross-correlation function $\Phi_{AB}(\tau)$ according to a measurement section between the position A and the position B is equal to or more than a previously-set setting value T, it is determined that leakage occurs in the measurement section, and in the case in which the cross-correlation function $\Phi_{AB}(\tau)$ is less than the setting value T, it is determined that the leakage does not occur. The presence or absence of the leakage may be determined by a method in which the cross-correlation function is not used. When the cross-correlation function $\Phi_{AB}(\tau)$ is equal to or more than the previously-set setting value T, a maximum of the cross-correlation function $\Phi_{AB}(\tau)$ is calculated and a time $\Delta T$ of the maximum is calculated. Further, the time $\Delta T$ is a time difference $\Delta T$ between the vibration data $Y_A(t)$ and the vibration data $Y_B(t)$.

Figure 4:
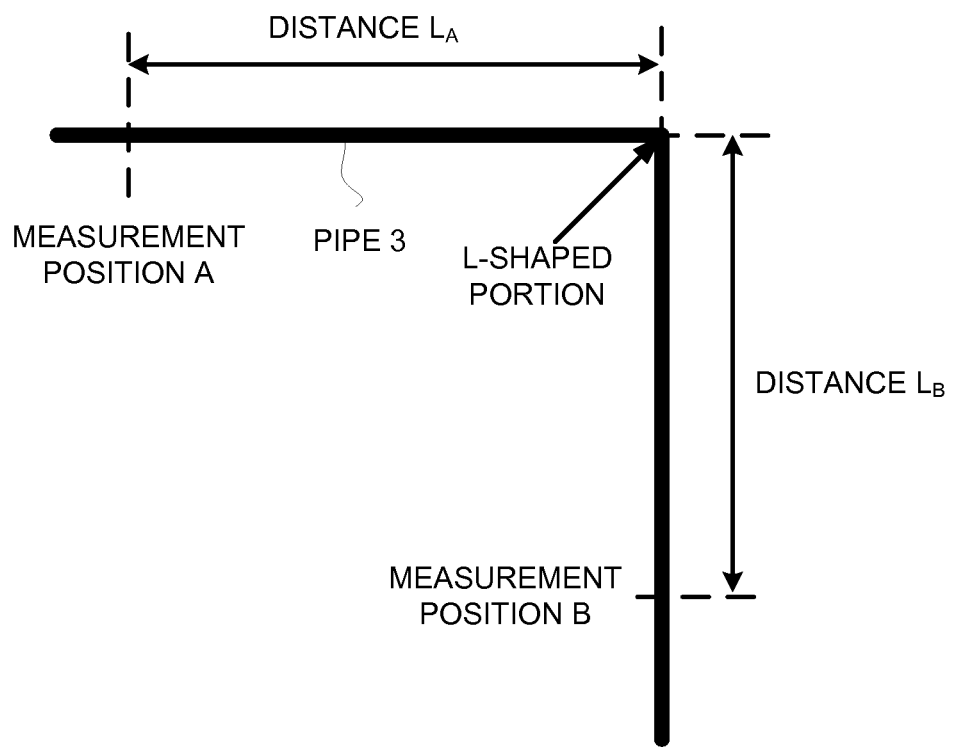
FIG. 4 illustrates an analysis of a leakage position.

Next, from the installation diagram of the pipes of the pipe installation database 20, the analysis unit 21 reads out a value of a distance $L_{AB}$ between the position A and the position B and a value of the propagation speed C of the pipe vibrations. In addition, the pipe 3 for detecting the leakage in the measurement section is not necessarily installed linearly; further, as illustrated in FIG. 4, for example, the pipe may be installed in an L shape depending on the measurement section. In this case, the distance $L_{AB}$ is set to a distance obtained by totalizing a distance $L_A$ being a direct distance from the measurement position A up to an L-shaped portion of the pipe 3 and a distance $L_B$ being a direct distance from the measurement position B up to an L-shaped portion of the pipe 3

Continuously, the calculated value of the time difference $\Delta\tau$ is substituted in a formula (2) to calculate a distance $L_{AP}$ up to the leakage position P from the measurement position A in which the measurement terminal $1_A$ is arranged.

$$L_{AP} = (L_{AB} - C \cdot \Delta\tau)/2 \qquad (2)$$

Figure 5:
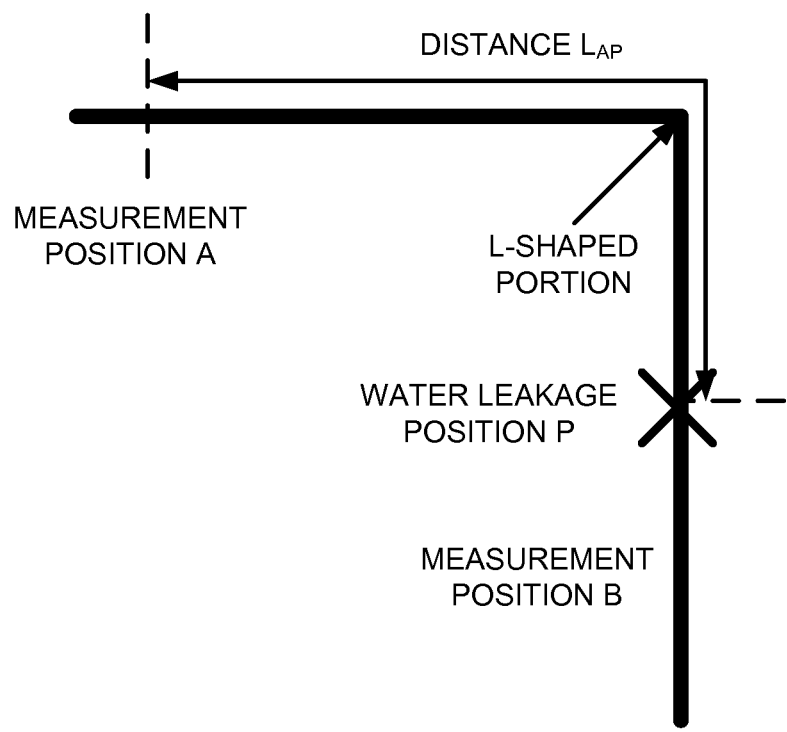
FIG. 5 illustrates an analysis of the leakage position.

As described above, in the case in which the pipe is installed in an L shape in the measurement section, the distance $L_{AP}$ is simply set to a length of the pipe, as illustrated in FIG. 5.

When the distance $L_{AP}$ up to the leakage position P is calculated, the leakage position analysis unit 21 specifies a geographical position of the leakage position P from the installation diagram of the pipes. Further, from the map information, the leakage position analysis unit 21 specifies a position of a manhole or a water meter nearest to the specified geographical position of the leakage position P.

Figure 6:
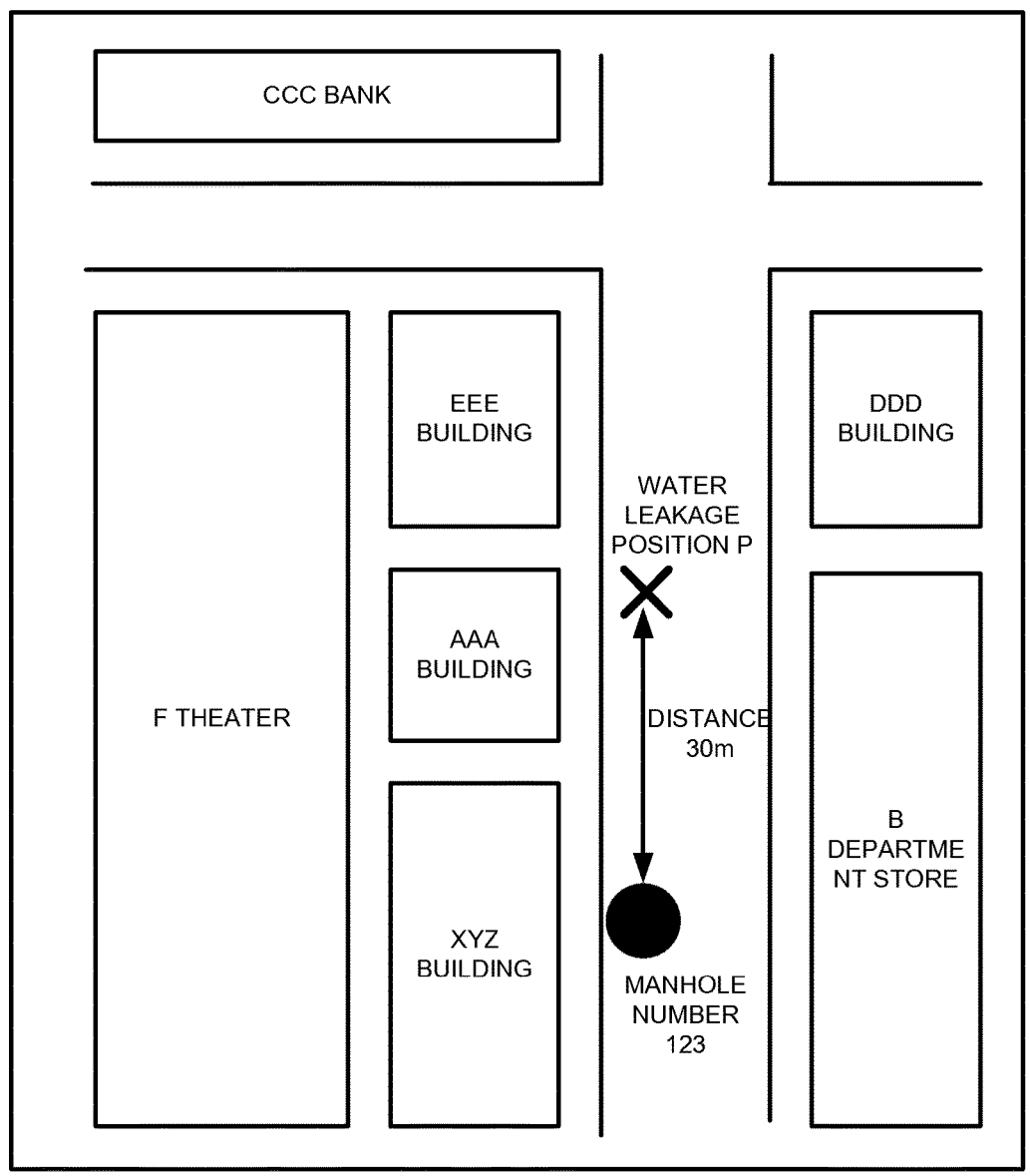
FIG. 6 illustrates a leakage position map.

Next, the leakage position analysis unit 21 prepares a neighboring map including the specified manhole or water meter based on the map information about the pipe installation database 20, plots the leakage position P and the manhole or water meter nearest to the leakage position P, and prepares a leakage position map in which the distance $L_{AP}$ up to the leakage position P from the nearest manhole or water meter is displayed. One example of the prepared leakage position map is illustrated in FIG. 6. In FIG. 6, the leakage position P and a geographical position of the manhole having a manhole number 123 nearest to the leakage position P are plotted on the neighboring map.

The leakage position map prepared as described above is transmitted as analysis results from the wireless communication unit 22 to the measurement terminals 1.

Figure 7:
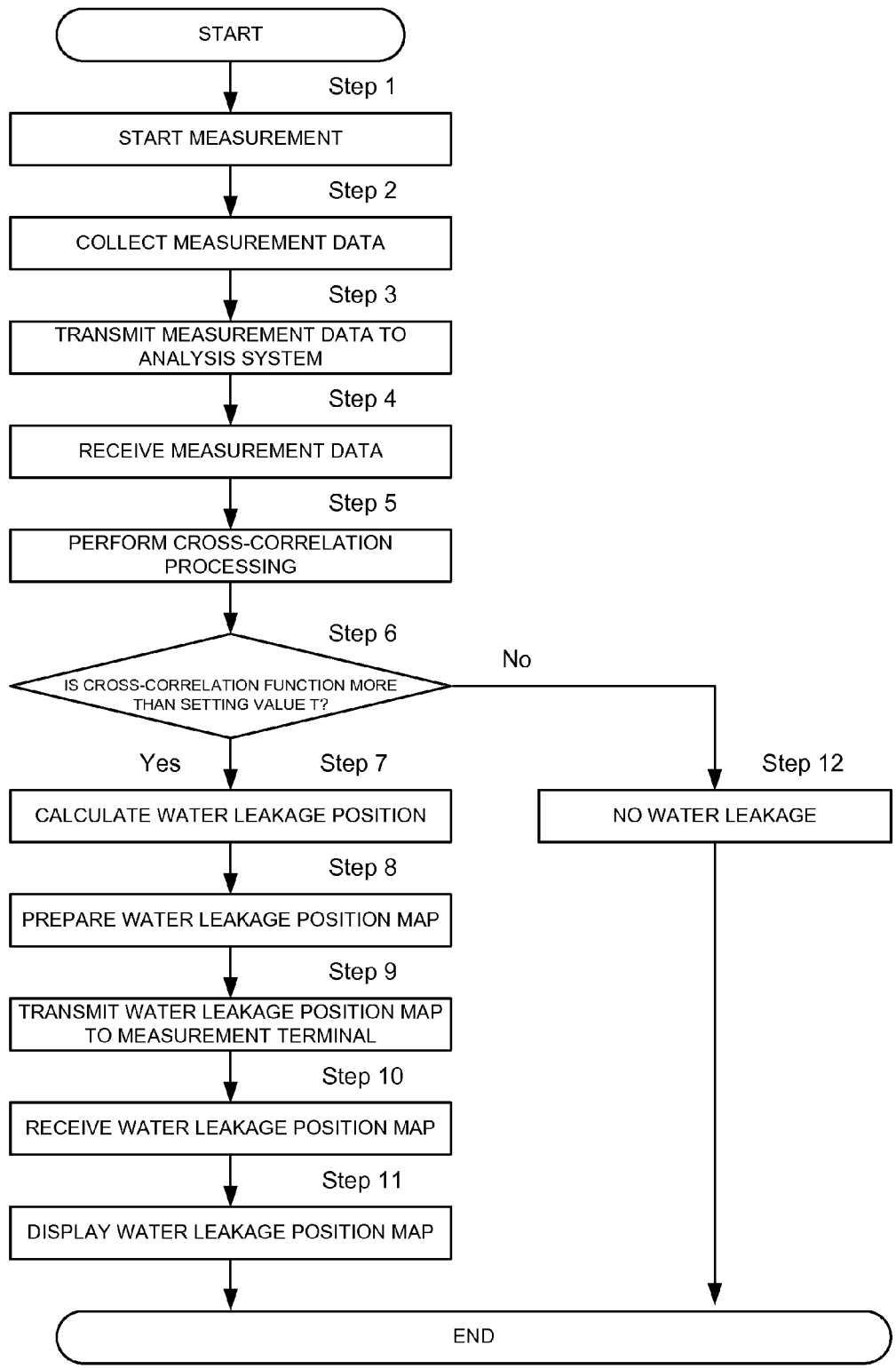
FIG. 7 is a flowchart illustrating operations of the leakage position analysis system according to the present embodiment.

Next, operations of the leakage analysis system according to the present embodiment will be described by a flowchart of FIG. 7. Suppose that an examiner arranges the measurement terminal $1_A$ in the position A and arranges the measurement terminal $1_B$ in the position B. Further, the leakage position map, which is the analysis results, is supposed to be transmitted only to the measurement terminal $1_A$; further, may be transmitted also to the measurement terminal $1_B$.

In the position A and the position B, the waveform vibration, the measurement position information, and the measurement time information are first measured by the vibration sensor 10, the measurement position information acquisition unit 11, and the measurement time information acquisition unit 12 of each of the measurement terminals $1_A$ and $1_B$ (step S1).

The measurement data collection unit 13 collects the measurement data (the waveform vibration data, the measurement position information, and the measurement time information) (step S2).

The control unit 14 transmits the measurement data from the measurement data collection unit 13 to the analysis system 2 via the wireless communication unit 15 (step S3).

The analysis system 2 receives (the waveform vibration data, the measurement position information, and the measurement time information) via the wireless communication unit 22 (step S4).

The analysis unit 21 of the analysis system 2 subjects the waveform vibration data between two points (the position A and the position B) set as the measurement section to cross-correlation processing (step S5).

Next, the analysis unit 21 determines whether a value of the cross-correlation function $\Phi_{AB}(\tau)$ calculated by the cross-correlation processing is more than the setting value T. As a result of the determination, in the case in which the cross-correlation function has a value more than the setting value T, it is determined that the leakage occurs (step S6—Yes). On the other hand, at step S6, in the case in which a value of the cross-correlation function $\Phi_{AB}(\tau)$ through the cross-correlation processing is less than the setting value T, it is determined that the leakage does not occur (step S6-No). The process permits the leakage detection process to be ended.

When it is detected that the leakage occurs, the analysis unit 21 reads out a value of the distance $L_{AB}$ between the position A and the position B and a value of the propagation speed C in the pipe vibrations from the pipe installation database 20, and calculates a difference $\Delta\tau$ of the propagation time between the waveform vibration data $Y_A(t)$ and $Y_B(t)$; then, the leakage position P is calculated (step S7).

When the distance $L_{AP}$ up to the leakage position P is calculated, the leakage position analysis unit 21 reads out map information corresponding to the geographical position of the leakage position P, specifies the manhole, etc. nearest to the leakage position P, prepares a neighboring map including the specified leakage position P, manhole, and the like, plots the leakage position P, the manhole nearest to the leakage position P, and the like, and prepares a leakage position map in which distances from the nearest manhole or the like up to the leakage position P are displayed (step S8).

The prepared leakage position map is transmitted as the analysis results to the measurement terminal $1_A$ by the wireless communication unit 22 (step S9).

The measurement terminal $1_A$ receives the leakage position map from the wireless communication unit 22 (step S10).

The control unit 14 of the measurement terminal $1_A$ displays the leakage position map on the output (display) unit 16 (step S11). One example of the leakage position map displayed on the output (display) unit 16 is illustrated in FIG. 8.

Figure 8:
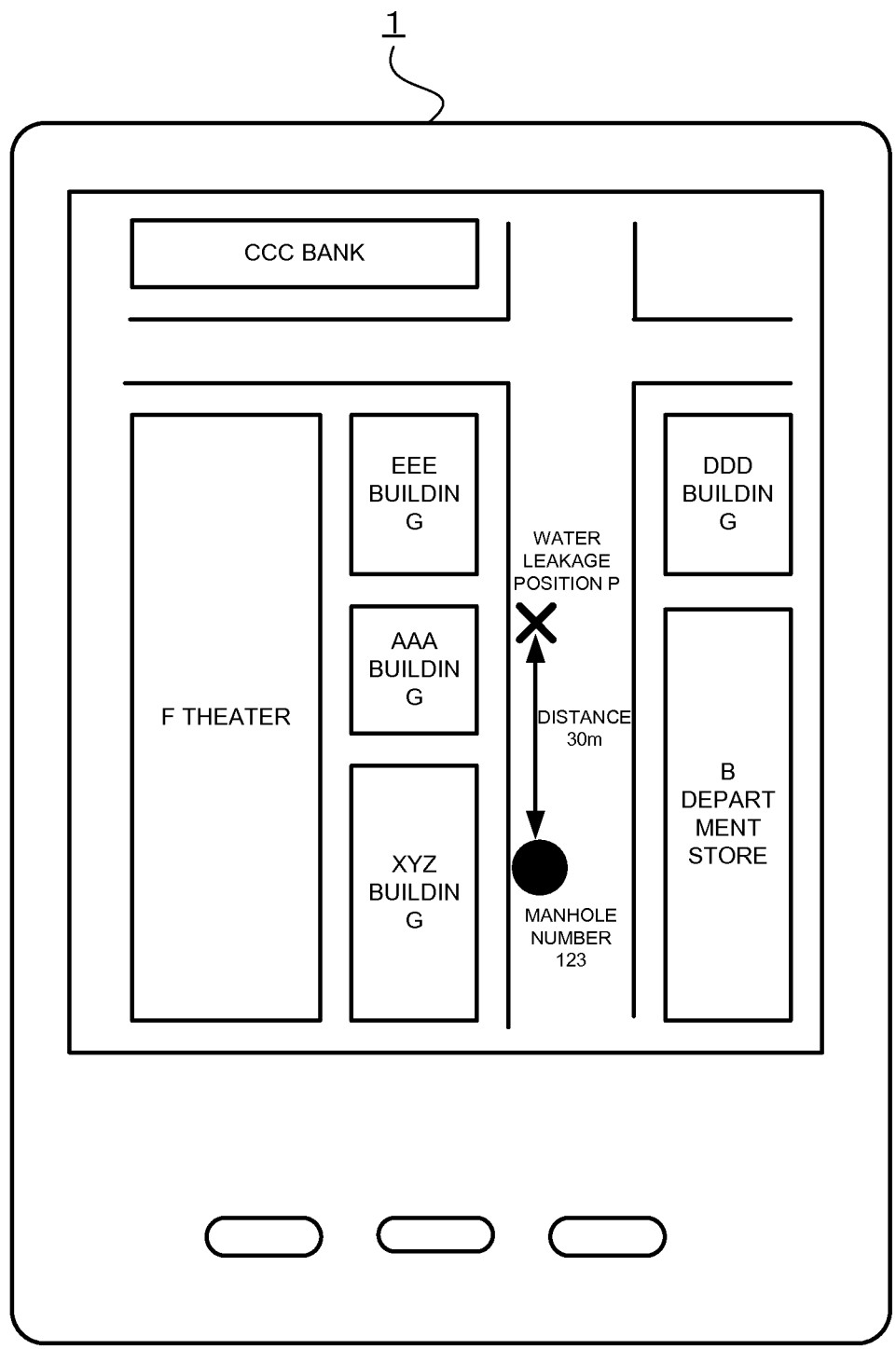
FIG. 8 illustrates one example of the leakage position map displayed on a measurement terminal.

In FIG. 8, the leakage position P and the manhole nearest to the leakage position P are plotted on a map on which roads and building names are displayed. Further, by confirming the analysis results, the examiner can know the manhole to be approached for confirming the leakage position P and rapidly confirm pipe leakage from the manhole.

As described above, in the first embodiment, when at least two measurement terminals are used, the leakage can be detected; therefore, cost required for the measurement terminals can be reduced.

Further, in the first embodiment, the examiner separates from a site once and receives the analysis results; further, need not go to the site twice to confirm a water leakage position, and therefore work and time required for an inspection can be largely reduced.

Further, in the first embodiment, the manhole, etc. near to the leakage position are illustrated in the map, and thereby the examiner can easily understand an approach route to the leakage position, and work and time required for the inspection can be largely reduced.

Further, in the first embodiment, a specific pipe configuration is not illustrated but the manhole, etc. near to the leakage position are displayed on a geographical map. Therefore, confidentiality relating to particularly important matters from a standpoint of public benefits, such as a pipe configuration of water pipes can be enhanced.

Figure 9:
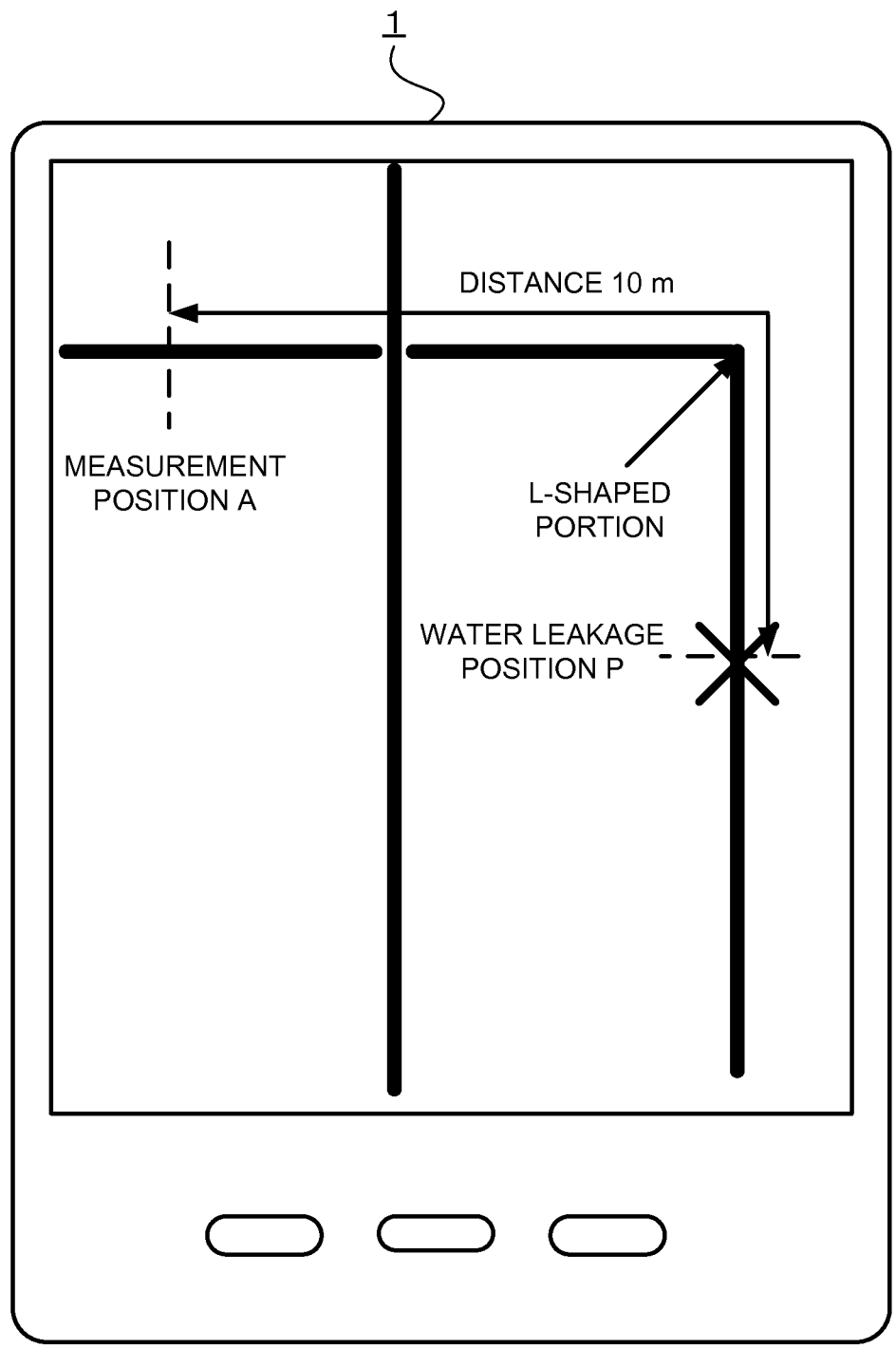
FIG. 9 illustrates one example of another leakage position map.

Further, in the case of the pipe configuration in which confidentiality is not emphasized, the pipe configuration may be illustrated as in FIG. 9. In FIG. 9, for example, not only the pipe 3 in the measurement section but also a pipe 4 intersecting with the pipe 3 is illustrated in a piping diagram. By the above-described display, also when pipes are installed intricately, the examiner can specify the leakage position P.

Further, in the first embodiment, an analysis is performed up to the leakage position of the pipes; further, a process may be performed up to a detection of the leakage and the analysis results thereof may be transmitted to the measurement terminals. Even if the above configuration is used, a cost, work, and time required for the inspection can be largely reduced.

Second Embodiment

A second embodiment will be described. With regard to contents that are the same as those of the first embodiment as described above, detailed descriptions will be omitted.

Figure 10:
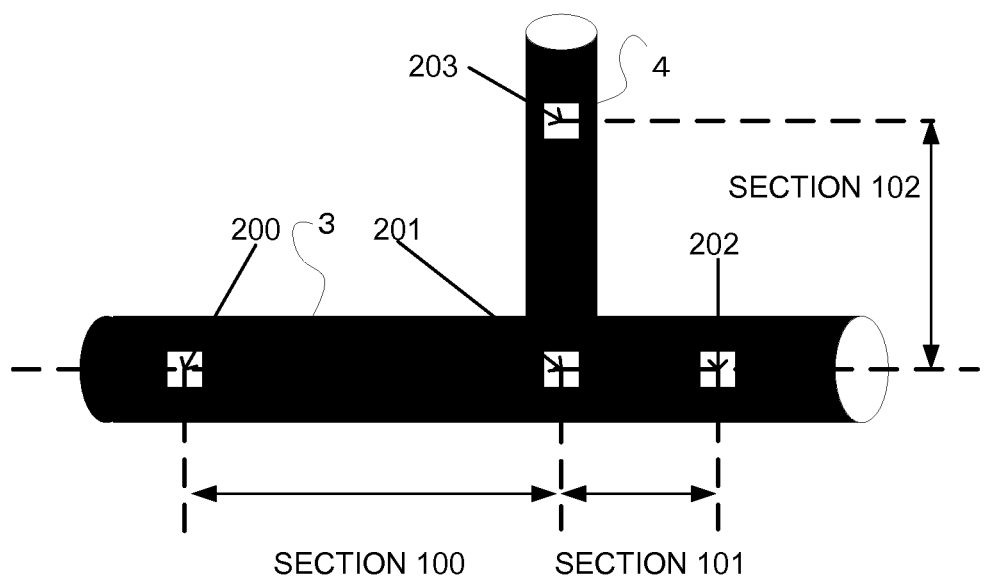
FIG. 10 illustrates a second embodiment.

FIG. 10 illustrates one example of the pipe. In FIG. 10, an example in which two pipes 4 each being a branch line are branched from the pipe 3 being a main line is illustrated. In each pipe, set are measurement terminal installation positions 200 to 203 in which an examiner can approach from a manhole, etc. and arrange measurement terminals.

In a piping example of FIG. 10, considering, for example, that the examiner arranges the measurement terminals 1 in the measurement terminal arrangement position 200 and the measurement terminal arrangement position 202, a peak of a correlation as measurement results is taken in a branched position of the pipe 4 of a branch line being a branch line. The reason is that water flows into the pipe 4 being a branch line branched from the pipe 3 being a main line, and the leakage of water does not occur actually. Further, in the second embodiment, for specifying a leakage position in which water leaks actually, an example for navigating that the measurement terminal is to be arranged in any of the measurement terminal arrangement positions will be described.

Operations until the examiner arranges the measurement terminals 1 and they transmit measurement results to the analysis system 2 are the same as those of the first embodiment; therefore, descriptions will be omitted. Further, in the following descriptions, the examiner is supposed to arrange the measurement terminal $1_A$ in the measurement terminal arrangement position 200 and arrange the measurement terminal $1_B$ in the measurement terminal arrangement position 202.

When the analysis system 2 receives measurement data (waveform vibration data, measurement position information, and measurement time information) from the measurement terminal $1_A$ and the measurement terminal $1_B$, the analysis unit 21 of the analysis system 2 subjects to cross-correlation processing the waveform vibration data between two points set as a measurement section. Then, the cross-correlation function $\Phi_{AB}(\tau)$ is calculated so that a value has a peak in a branched point of the pipe 4 being a branch line, and a position estimated to be the leakage position P can be specified. However, from a piping diagram of the pipe installation database 20, the analysis unit 21 can analyze that the estimated leakage position P is a branched point of the pipe 4 being a branch line and a leakage does not occur actually.

Consequently, for specifying the leakage position, the analysis unit 21 of the analysis system 2 determines a new measurement terminal arrangement position as an example so as to narrow the measurement section. In the above-described example, for example, the measurement terminal $1_A$ is installed in the measurement terminal arrangement position 200 and the measurement terminal $1_B$ is arranged in the measurement terminal arrangement position 202, and the measurement section is a measurement section obtained by totalizing a section 100 and a section 101. Therefore, the measurement section is divided into the section 100 and the section 101 and the measurement terminal arrangement position is determined.

Specifically, from map data and position information about the analyzed leakage position P, the analysis unit 21 determines a position in which the measurement terminal is to be arranged. In this example, the analysis unit 21 determines the measurement terminal arrangement position 200 and the measurement terminal arrangement position 201 as the measurement terminal arrangement position. That is, the analysis unit 21 determines the measurement terminal arrangement positions in which the section 100 is capable of being measured.

Figure 11:
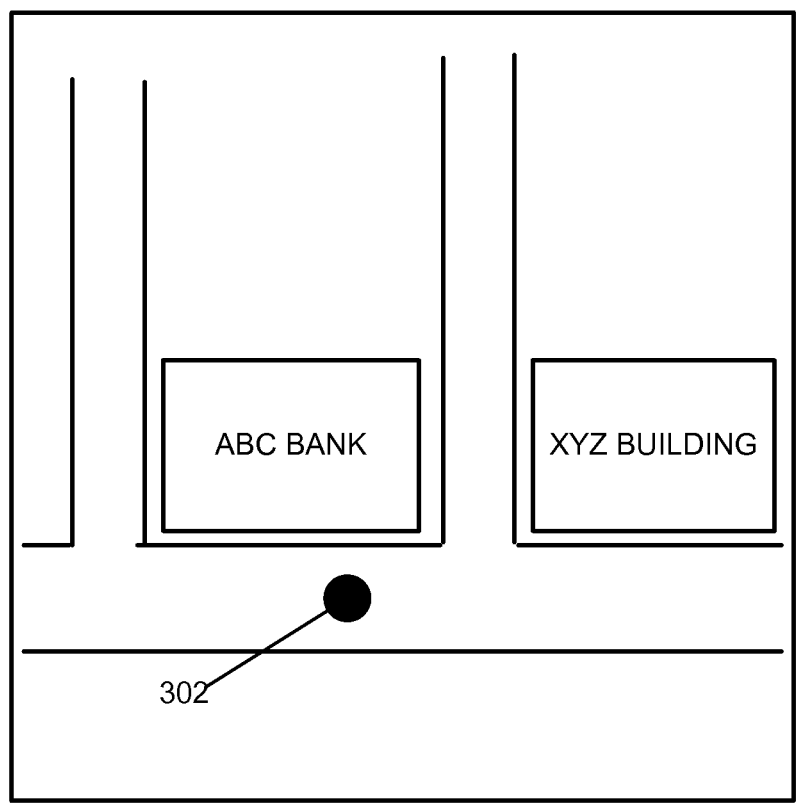
FIG. 11 illustrates the second embodiment.

The analysis unit 21 prepares a measurement terminal arrangement position instruction map for navigation so as to arrange in the measurement terminal arrangement position 201 the measurement terminal $1_B$ arranged in the measurement terminal arrangement position 203. For example, it is the measurement terminal arrangement position instruction map in which a position of a manhole number 302 corresponding to the measurement terminal arrangement position 201 is plotted on the map. One example of this measurement terminal arrangement position instruction map is illustrated in FIG. 11. FIG. 11 illustrates one example of the measurement terminal arrangement position instruction map indicating the position of the manhole number 302 corresponding to the measurement terminal arrangement position 201. Further, the analysis system 2 transmits the measurement terminal arrangement position instruction map that is prepared in the measurement terminal $1_B$.

Continuously, the examiner views the measurement terminal arrangement position instruction map displayed on the measurement terminal $1_B$, approaches from the manhole 302, and arranges the measurement terminal $1_B$ in the measurement terminal arrangement position 201. Then, a measurement of the section 100 is performed by the measurement terminal $1_A$ and the measurement terminal $1_B$, and the measured data (the waveform vibration data, the measurement position information, and the measurement time information) is transmitted to the analysis system 2.

Again, when the analysis system 2 receives the measurement data (the waveform vibration data, the measurement position information, and the measurement time information) from the measurement terminal $1_A$ and the measurement terminal $1_B$, the analysis unit 21 of the analysis system 2 subjects the waveform vibration data between two points set as the measurement section to the cross-correlation processing. Here, in the section 100, when the leakage position cannot be specified, the analysis unit 21 determines the measurement terminal arrangement position 201 and the measurement terminal arrangement position 202 as the measurement terminal arrangement position. That is, positions in which the section 101 is capable of being measured are determined as the measurement terminal arrangement position. Then, in the same manner as in the above, the measurement terminal arrangement position instruction map for navigation is prepared so as to arrange the measurement terminal $1_A$ in the measurement terminal arrangement position 202. Then, until the leakage position can be specified, the analysis system 2 performs the same processing as that of the above and instructs the measurement terminal arrangement position so as to sequentially narrow the measurement section.

Further, in the section 101, when the leakage position cannot be specified, the analysis unit 21 determines as the measurement terminal arrangement position the measurement terminal arrangement position 201 and the measurement terminal arrangement position 203 in which the measurement section 102 is capable of being measured. Then, in the same manner as in the above, the measurement terminal arrangement position instruction map for navigation is prepared so as to arrange the measurement terminal $1_A$ in the measurement terminal arrangement position 203.

Suppose here that the measurement terminal $1_A$ is arranged in the measurement terminal arrangement position 203 and the measurement terminal $1_B$ is arranged in the measurement terminal arrangement position 201 to specify the leakage position in the section 102; in this case, the leakage position map in which a position of the manhole nearest to the leakage position P is indicated in the same manner as in the first embodiment is prepared and an idea thereof is transmitted to the measurement terminal $1_B$.

Further, the analysis unit 21 of the analysis system 2 may determine a new measurement terminal arrangement position. The analysis unit 21 determines the new measurement terminal arrangement positions in the section 102 so that a section between the new measurement terminal arrangement positions is a section that is narrower than that (the section 102) between positions in which the measurement terminals are arranged and the analyzed leakage position is sandwiched. By performing the measurement in a narrower section again, the analysis system 2 is capable of estimating the leakage position with higher accuracy.

Further, when the leakage position does not exist in any one of the sections 100, 101, and 102, a peak of the cross-correlation function exists in an edge of any one of the sections and any one of the measurement terminal arrangement positions is output as the leakage position P. In this case, the leakage position map is prepared so that a manhole in the outside of the measurement terminal arrangement position output as the leakage position is navigated as the new measurement terminal arrangement position, and the leakage position map is transmitted to the measurement terminal $1_B$.

In addition, in the embodiment as described above, an example in which the leakage detection is performed by two measurement terminals is described; however, the embodiment is not limited thereto. The leakage detection can be performed by three or more measurement terminals, and in this case, the measurement can be performed with higher accuracy. When the measurement terminals are combined two by two and the leakage position is specified, the leakage position is affected by an error of an acoustic velocity of tubes, etc.; therefore, the leakage position may not be matched with each other in each combination of the measurement terminals. In this case, the leakage position in each combination of the measurement terminals is considered not as a point but as a range in which an error is considered; further, a range in which the ranges are overlapped may be specified as the leakage position.

In the second embodiment, effects capable of performing the leakage detection more efficiently are exerted in addition to the effects of the first embodiment.

In addition, in the above-described embodiment, each unit is composed by hardware; further, may be composed also by programs for instructing an information processing device (CPU) to execute the above-described processing of operations.

In addition, a part or all of the embodiments can be described as in the following supplementary note; however, is not limited thereto.

(Supplementary note 1) A leakage position analysis system for analyzing a leakage position in a pipe, comprising:

at least two or more measurement terminals that are arranged on the pipe; and an analysis means, wherein the measurement terminal includes:

a vibration sensor configured to measure pipe vibrations in the pipe;

a measurement position information acquisition means configured to acquire measurement position information;

a measurement time information acquisition means configured to acquire measurement time information;

a wireless transmission means configured to transmit the pipe vibrations, the measurement position information, and the measurement time information to the analysis means by wireless communication;

a wireless reception means configured to receive an analysis result of the analysis means by wireless communication; and an output means configured to output the analysis result of the analysis means, the analysis means includes:

a wireless reception means configured to receive the pipe vibrations, the measurement position information, and the measurement time information from the measurement terminal by wireless communication;

a storage means configured to store pipe data relating to an installation structure and installation position of the pipe;

a leakage position analysis means configured to analyze a leakage position in the pipe based on the pipe vibrations, the measurement position information, the measurement time information, and the pipe data; and a wireless transmission means configured to transmit the analysis result to the measurement terminal by wireless communication.

(Supplementary note 2) The leakage position analysis system described in the supplementary note 1, wherein in the storage means of the analysis means, map data including position information about a manhole to the pipe or a measurement meter arranged in the pipe is stored, the leakage position analysis means seeks a manhole or a measurement meter as a target of the leakage position from the map data and the position information of the analyzed leakage position, prepares a leakage position map in which the sought manhole or measurement meter is plotted on a map, and transmits the leakage position map to the measurement terminals via the wireless transmission means.

(Supplementary note 3) The leakage position analysis system described in the supplementary note 1 or 2, wherein the leakage position analysis means prepares a measurement terminal arrangement position instruction map in which a manhole or a measurement meter corresponding to arrangement positions in which the measurement terminals are to be installed is plotted on the map, and transmits the measurement terminal arrangement position instruction map to the measurement terminals via the wireless transmission means.

(Supplementary note 4) The leakage position analysis system described in the supplementary note 3, wherein the leakage position analysis means determines new measurement terminal arrangement positions so as to narrow a measurement section more than measured measurement section.

(Supplementary note 5) The leakage position analysis system described in the supplementary note 3, wherein the leakage position analysis means determines arrangement positions in which the measurement terminals are to be arranged from the map data and the position information of the analyzed leakage position.

(Supplementary note 6) The leakage position analysis system described in the supplementary note 5, wherein when there is the analyzed leakage position in a section between positions in which the measurement terminals are arranged, the leakage position analysis means determines arrangement positions in which the measurement terminals are to be arranged so that the section between arrangement positions in which the measurement terminals are to be arranged is a section narrower than that between the positions in which the measurement terminals are arranged and the analyzed leakage position is sandwiched.

(Supplementary note 7) A leakage position analysis apparatus for detecting leakage in a pipe, comprising:

a storage means configured to store pipe data relating to an installation structure and installation position of the pipe;

a leakage position analysis means configured to analyze a leakage position of the pipe based on pipe vibrations, measurement position information, and measurement time information of the pipe measured by at least two or more measurement terminals; and a transmission means configured to transmit the analysis result to the measurement terminals.

(Supplementary note 8) The leakage position analysis apparatus described in the supplementary note 7, wherein in the storage means, map data including position information about a manhole to the pipe or a measurement meter arranged in the pipe is stored, the leakage position analysis means seeks the manhole or measurement meter as a target of the leakage position from the map data and the position information of the analyzed leakage position, prepares a leakage position map in which the sought manhole or measurement meter is plotted on a map, and transmits the leakage position map to the measurement terminals.

(Supplementary note 9) The leakage position analysis apparatus described in the supplementary note 7 or 8, wherein the leakage position analysis means prepares a measurement terminal arrangement position instruction map in which the manhole or measurement meter corresponding to arrangement positions in which the measurement terminals are to be arranged is plotted on the map, and transmits the measurement terminal arrangement position instruction map to the measurement terminals via the wireless transmission means.

(Supplementary note 10) A measurement terminal arranged in a pipe, comprising:

a vibration sensor configured to measure pipe vibrations in the pipe;

a measurement position information acquisition means configured to acquire measurement position information;

a measurement time information acquisition means configured to acquire measurement time information;

a wireless transmission means configured to transmit the pipe vibrations, the measurement position information, and the measurement time information to an analysis means by wireless communication;

a wireless reception means configured to receive an analysis result of the analysis means by wireless communication; and an output means configured to output the analysis result of the analysis means.

(Supplementary note 11) A leakage position analysis method for analyzing a leakage position in a pipe, including:

causing at least two or more measurement terminals to be arranged in the pipe;

causing the measurement terminals to measure pipe vibrations, measurement position information, and measurement time information of the pipe;

causing the measurement terminals to transmit the pipe vibrations, the measurement position information, and the measurement time information to an analysis means by wireless communication;

causing the analysis means to receive the pipe vibrations, the measurement position information, and the measurement time information from the measurement terminals by wireless communication;

causing the analysis means to analyze the leakage position in the pipe based on pipe data relating to an installation structure and installation position of the pipe and the pipe vibrations, the measurement position information, and the measurement time information;

causing the analysis means to transmit the analysis result to the measurement terminals by wireless communication;

causing the measurement terminals to receive the analysis result by wireless communication; and causing the measurement terminals to output the received analysis result.

(Supplementary note 12) The leakage position analysis method described in the supplementary note 11, wherein in a storage means of the analysis means, map data including position information about a manhole to the pipe or a measurement meter arranged in the pipe is stored, and the leakage position analysis means seeks the manhole or measurement meter as a target of the leakage position from the map data including position information about the manhole to the pipe or the measurement meter arranged in the pipe and the position information about the analyzed leakage position, prepares a leakage position map in which the sought manhole or measurement meter is plotted on a map, and transmits the leakage position map to the measurement terminals.

(Supplementary note 13) The leakage position analysis method described in the supplementary note 11 or 12, further including:

preparing a measurement terminal arrangement position instruction map in which the manhole or measurement meter corresponding to arrangement positions in which the measurement terminals are to be arranged is plotted on the map, and transmitting the measurement terminal arrangement position instruction map to the measurement terminals.

Each embodiment as described above is a mere preferable embodiment of the present invention and thus the present invention will not be limited only to the embodiment. It is possible to carry out the present invention with various changes and modifications without departing from the spirit and scope of the invention.

This application is based upon and claims the benefit of priority of the prior Japanese Patent Application No. 2012-204916, filed on Sep. 18, 2012, the entire contents of which are incorporated herein by reference.

REFERENCE SIGNS LIST 1A, 1B measurement terminal
2 analysis system
3, 4 pipe
10 vibration sensor
11 measurement position information acquisition unit
12 measurement time information acquisition unit
13 data collection unit
14 control unit
15 wireless communication unit
16 output (display) unit
20 pipe installation database
21 leakage position analysis unit
22 wireless communication unit

What is claimed is:

1. A leakage position analysis system for analyzing a leakage position in a pipe, the leakage position analysis system comprising:

at least two or more measurement terminals that are arranged on the pipe; and
an analyzer,
wherein each one of the measurement terminals includes:
a vibration sensor configured to measure pipe vibrations in the pipe;
a measurement position information acquisition unit configured to acquire measurement position information;
a measurement time information acquisition unit configured to acquire measurement time information;
a first wireless communication unit configured to transmit the pipe vibrations, the measurement position information, and the measurement time information to the analyzer by wireless communication,
wherein the first wireless communication unit is configured to receive an analysis result of the analyzer by wireless communication; and
an output unit configured to output the analysis result of the analyzer,
wherein the analyzer includes:
a second wireless communication unit configured to receive the pipe vibrations, the measurement position information, and the measurement time information from the measurement terminal by wireless communication;
a storage configured to store pipe data relating to an installation structure and installation position of the pipe and map data including position information about a manhole to the pipe or a measurement meter arranged in the pipe; and
a leakage position analyzer configured to analyze a leakage position in the pipe based on the pipe vibrations, the measurement position information, the measurement time information, and the pipe data, seek a manhole or a measurement meter near the leakage position from the map data and the position information of the analyzed leakage position, and prepare a leakage position map in which the sought manhole or measurement meter is plotted on a map,
wherein the second wireless communication unit is configured to transmit the analysis result and the leakage position map to the measurement terminal by wireless communication.

2. The leakage position analysis system according to claim 1, wherein the leakage position analyzer is configured to prepare a measurement terminal arrangement position instruction map in which a manhole or a measurement meter corresponding to arrangement positions in which the measurement terminals are to be installed is plotted on the map, and transmit the measurement terminal arrangement position instruction map to the measurement terminals via the second wireless communication unit.

3. The leakage position analysis system according to claim 2, wherein the leakage position analyzer is configured to determine new measurement terminal arrangement positions so as to narrow a measurement section more than a measured measurement section.

4. The leakage position analysis system according to claim 2, wherein the leakage position analyzer is configured to determine arrangement positions in which the measurement terminals are to be arranged from the map data and the position information of the analyzed leakage position.

5. The leakage position analysis system according to claim 4, wherein the leakage position analyzer is configured to, when there is the analyzed leakage position in a section between positions in which the measurement terminals are arranged, determine arrangement positions in which the measurement terminals are to be arranged so that the section between arrangement positions in which the measurement terminals are to be arranged is a section narrower than that between the positions in which the measurement terminals are arranged and the analyzed leakage position is sandwiched.

6. A leakage position analysis method for analyzing a leakage position in a pipe, the leakage position analysis method comprising:

causing at least two or more measurement terminals to be arranged in the pipe;

causing the measurement terminals to measure pipe vibrations, measurement position information, and measurement time information of the pipe;

causing the measurement terminals to transmit the pipe vibrations, the measurement position information, and the measurement time information to an analyzer by wireless communication;

causing the analyzer to receive the pipe vibrations, the measurement position information, and the measurement time information from the measurement terminals by wireless communication;

causing the analyzer to analyze the leakage position in the pipe based on pipe data relating to an installation structure and installation position of the pipe and the pipe vibrations, the measurement position information, and the measurement time information;

causing the analyzer to seek a manhole to the pipe or a measurement meter arranged in the pipe near the leakage position from map data including position information about the manhole or the measurement meter and the position information about the analyzed leakage position, and prepare a leakage position map in which the sought manhole or measurement meter is plotted on a map;

causing the analyzer to transmit the analysis result and the leakage position map to the measurement terminals by wireless communication;

causing the measurement terminals to receive the analysis result and the leakage position map by wireless communication; and causing the measurement terminals to output the received analysis result and the leakage position map.

7. The leakage position analysis method according to claim 6, the leakage position analysis method further including:

preparing a measurement terminal arrangement position instruction map in which the manhole or measurement meter corresponding to arrangement positions in which the measurement terminals are to be arranged is plotted on the map, and transmitting the measurement terminal arrangement position instruction map to the measurement terminals.

\* \* \* \* \*